United States Patent
Nondahl et al.

(10) Patent No.: US 9,287,812 B2
(45) Date of Patent: Mar. 15, 2016

(54) METHOD AND APPARATUS FOR STABILITY CONTROL OF OPEN LOOP MOTOR DRIVE OPERATION

(71) Applicants: Thomas Nondahl, Greenfield, WI (US); Jingbo Liu, Grafton, WI (US); Peter Schmidt, Franklin, WI (US); Semyon Royak, Orange Village, OH (US); Timothy M. Rowan, Wauwatosa, WI (US)

(72) Inventors: Thomas Nondahl, Greenfield, WI (US); Jingbo Liu, Grafton, WI (US); Peter Schmidt, Franklin, WI (US); Semyon Royak, Orange Village, OH (US); Timothy M. Rowan, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/193,329

(22) Filed: Feb. 28, 2014

(65) Prior Publication Data

US 2015/0002067 A1 Jan. 1, 2015

Related U.S. Application Data

(63) Continuation-in-part of application No. 13/931,839, filed on Jun. 29, 2013, now Pat. No. 9,054,611.

(51) Int. Cl.
*H02P 6/08* (2006.01)
*H02P 21/00* (2006.01)

(52) U.S. Cl.
CPC . *H02P 6/08* (2013.01); *H02P 21/00* (2013.01)

(58) Field of Classification Search
CPC .......................................................... H02P 6/08
USPC ......................... 318/503, 400.04, 400.01, 700
See application file for complete search history.

(56) References Cited

U.S. PATENT DOCUMENTS

| | | | |
|---|---|---|---|
| 3,723,840 A | 3/1973 | Opal et al. | |
| 4,823,251 A | 4/1989 | Kawabata et al. | |
| 5,744,921 A | 4/1998 | Makaran | |
| 5,909,098 A | 6/1999 | Konecny et al. | |
| 5,959,431 A | 9/1999 | Xiang | |
| 6,121,736 A * | 9/2000 | Narazaki et al. | 318/400.35 |
| 6,124,697 A | 9/2000 | Wilkerson | |
| 6,208,537 B1 | 3/2001 | Skibinski et al. | |
| 6,329,781 B1 | 12/2001 | Matsui et al. | |
| 6,940,249 B2 | 9/2005 | Toyoda | |

(Continued)

FOREIGN PATENT DOCUMENTS

| | | |
|---|---|---|
| CN | 2513286 Y | 9/2002 |
| CN | 201504207 U | 6/2010 |

(Continued)

OTHER PUBLICATIONS

Halkassari, Optimal U/F-Control of High Speed Permanent Magnet Motors, 2006, IEEE, pp. 2302-2308.

(Continued)

*Primary Examiner* — David S Luo
(74) *Attorney, Agent, or Firm* — Fay Sharpe LLP

(57) ABSTRACT

Motor drives and control methods are presented for sensorless motor speed control in which inverter output currents are sampled from the inverter output and a frequency modulation value is determined based on the current feedback. A speed or frequency setpoint is adjusted at least partially according to the frequency modulation value to provide an adjusted frequency or speed setpoint value that is then used in controlling the inverter to provide stability control to mitigate hunting or motor stoppage.

20 Claims, 12 Drawing Sheets

(56) References Cited

U.S. PATENT DOCUMENTS

| | | | |
|---|---|---|---|
| 7,045,988 B2 | 5/2006 | Ha et al. | |
| 7,102,323 B2 | 9/2006 | Zhou et al. | |
| 7,679,308 B2 | 3/2010 | Tomigashi | |
| 7,724,549 B2 | 5/2010 | Skibinski et al. | |
| 7,729,146 B2 * | 6/2010 | Hayami et al. | 363/98 |
| 7,979,223 B2 | 7/2011 | Monti et al. | |
| 7,990,097 B2 | 8/2011 | Cheng et al. | |
| 8,009,450 B2 | 8/2011 | Royak et al. | |
| 8,217,602 B2 * | 7/2012 | Ikei | H02P 6/182 318/400.13 |
| 8,288,886 B2 | 10/2012 | Anwar et al. | |
| 8,736,220 B2 | 5/2014 | Ogawa et al. | |
| 2006/0113952 A1 | 6/2006 | Zhou | |
| 2007/0007929 A1 | 1/2007 | Lee et al. | |
| 2008/0074074 A1 | 3/2008 | Skibinski et al. | |
| 2008/0312855 A1 | 12/2008 | Monti et al. | |
| 2009/0146592 A1 | 6/2009 | Tobari et al. | |
| 2011/0109155 A1 | 5/2011 | Anwar et al. | |

FOREIGN PATENT DOCUMENTS

| | | |
|---|---|---|
| CN | 101950983 A | 1/2011 |
| CN | 202872721 U | 4/2013 |
| EP | 1635448 A1 | 3/2006 |
| JP | 2001-025282 | 1/2001 |
| WO | WO2009093214 A2 | 7/2009 |

OTHER PUBLICATIONS

Fatu et al., I-F Starting Method With Smooth Transition to EMF Based Motion-Sensorless Vector Control of PM Synchronous Motor/Generator, 2008, IEEE, pp. 1481-1487.

Kim et al., "PWM Switching Frequency Signal Injection Sensorless Methods in IPMSM", IEEE, 2011, pp. 3021-3028.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kobayashi et al., "Investigation of IPMSM's Position Estimation in Low Speed Region with DC Link Current Detection", IEEE Jan. 2007, pp. 1411-1416.

"Guidelines for the Use of 400-600 Volt AC Drives in Medium Voltage Applications," Yaskawa Application Note, 2005.

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE 13$^{th}$ Int'l Conf. on Optimization of Electrical and Electronic Equipment (OPTIM), May 2012, pp. 432-438.

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park,Jae-Do et al., "*Design and Control of High-Speed Solid-Rotor Synchronous Reluctance Drive With Three-Phase LC Filter*", downloaded on Sep. 24, 2009 from IEEE Xplore, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", in Proceedings of the 32$^{nd}$ Annual Conference of the IEEE Industrial Electronics Society (IECON 2006), Paris, France, pp. 1059-1064.

U.S. Appl. No. 13/742,405, filed Jan. 16, 2013, entitled "Method and Apparatus for Controlling Power Converter With Inverter Output Filter", to Liu et al.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kukrer, "Deadbeat Control of a Three-Phase Inverter with an Output LC Filter", IEEE Transactions on Power Electronics, vol. 11, No. 1, Jan. 1996, 8 pgs.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

European Search Report, EP Appl. No. 14173909.4-1806/2838193; Mailed Jun. 25, 2015; Completed Jun. 17, 2015; Munich, Germany; 8 pgs.

Miranda et al., "Parameter and Speed Estimation for Implementing Low Speed Sensorless PMSM Drive System Based on an Algebraic Method"; Applied Power Electronics Conf.; APEC 2007, 22$^{nd}$ Annual IEEE; Feb. 1, 2007,;pp. 1406-1410.

(56) References Cited

OTHER PUBLICATIONS

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

* cited by examiner

METHOD AND APPARATUS FOR STABILITY CONTROL OF OPEN LOOP MOTOR DRIVE OPERATION

REFERENCE TO RELATED APPLICATION

This application is a continuation-in-part of, and claims priority to and the benefit of, U.S. patent application Ser. No. 13/931,839, filed on Jun. 29, 2013, entitled METHOD AND APPARATUS FOR STABILITY CONTROL OF OPEN LOOP MOTOR DRIVE OPERATION, the entirety of which application is hereby incorporated by reference.

BACKGROUND INFORMATION

The subject matter disclosed herein relates to power conversion, and more specifically to apparatus and techniques for sensorless motor control.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides motor drive apparatus and control techniques by which improved motor speed stability can be facilitated, and finds particular utility in association with open loop or sensorless speed control applications involving asynchronous or synchronous motors, directly driven or in combination with output filters and/or output transformers. The disclosed techniques, moreover, can be employed in systems using voltage-frequency and/or current-frequency control algorithms.

Methods are disclosed in accordance with one or more aspects of the present disclosure for sensorless motor speed control in a motor drive. The methods include sampling one or more AC output current feedback signals or values from the output of the motor drive inverter, and computing a frequency modulation value based on the output current feedback and/or on one or more voltage command or voltage feedback signals or values. In addition, the methods involve adjusting a frequency or speed setpoint value based in whole or in part on the frequency modulation value in order to provide an adjusted frequency or speed setpoint value, as well as controlling the motor drive inverter according to the adjusted frequency or speed setpoint value. The original speed or frequency setpoint may, in certain embodiments, be rate limited prior to adjustment according to the modulation value. In addition, the adjustment may involve subtracting the modulation value from the rate limited or original frequency or speed setpoint value. In certain embodiments, moreover, the modulation value computation may include computing an estimated motor performance value, such as estimated electromagnetic torque, torque angle, power factor, power factor angle, power, or error between the open loop angle and an estimated rotor position, or other performance value related to operation of the motor which can be estimated according to the current feedback and/or one or more voltage signals. In addition, the estimated motor performance value may be high pass filtered in certain embodiments to remove any DC offset prior to adjustment of the received speed or frequency setpoint.

Motor drives are provided in accordance with further aspects of the disclosure, including an inverter which provides AC output power to drive a motor load, as well as a sensorless motor speed controller that provides switching control signals to operate the inverter based at least in part on a frequency or speed setpoint. The motor speed controller implements a signal generator which computes a frequency modulation value according to one or more AC output current feedback signals or values representing the output current of the inverter, and/or according to one or more voltage command signals or values used in controlling the inverter. In addition, the motor speed controller includes an adjustment component which adjusts the frequency or speed setpoint value based in whole or in part on the frequency modulation value in order to provide an adjusted frequency or speed setpoint value, as well as a command generator which provides switching control signals to the inverter at least partially according to the adjusted frequency or speed setpoint value.

In certain embodiments, the signal generator computes an estimated motor performance value based on the AC output current feedback and/or on one or more voltage command or voltage feedback signals or values, and computes the frequency modulation value according to the estimated motor performance value. In addition, the motor speed controller may include a high pass filter for filtering the estimated motor performance value, and the resulting filtered estimated motor performance value is used in computing the frequency modulation value in certain embodiments. The signal generator in certain embodiments computes the estimated motor performance value as an estimated torque value, power factor value, power factor angle value or power value. In certain embodiments, the sensorless motor speed controller includes a rate limiter which operates to rate limit the frequency or speed setpoint, and the adjustment component subtracts the frequency modulation value from the rate limited frequency or speed setpoint value to provide the adjusted frequency or speed setpoint value for operating the inverter. The adjustment component in certain embodiments subtracts the frequency modulation value from the frequency or speed setpoint value in order to provide the adjusted frequency or speed setpoint.

Further embodiments provide methods for motor drive control, including sampling one or more output current feedback signals or values from an inverter, computing a frequency modulation value at least partially according to the output current feedback signal or value, as well as adjusting a frequency or speed setpoint based at least partially on the frequency modulation value and controlling the inverter according to the adjusted frequency or speed setpoint value. In certain embodiments, the frequency or speed setpoint value is rate limited and the frequency modulation value is subtracted from the rate limited setpoint to provide the adjusted frequency or speed setpoint value. In certain embodiments an estimated per unit output current signal or value is computed according to the output current feedback signal or value, and the frequency modulation value is computed at least partially based on the estimated per unit output current signal or value. The output current feedback signal or value is high pass filtered in certain embodiments, and the frequency modulation value is computed at least partially according to the filtered estimated output current signal or value. In certain implementations, moreover, the filtered signal or value may be amplified by a gain factor to provide an amplified signal, and a range of the amplified signal is selectively limited, with the frequency modulation value being computed based at least partially on the range limited amplified signal.

In certain embodiments, an estimated per unit output current signal or value is computed and the frequency modulation value is computed accordingly. The estimated per unit output current signal or value may be high pass filtered in certain embodiments, and the frequency modulation value is computed at least partially based on the filtered estimated per unit output current signal or value. The filtered estimated per unit output current signal or value may be amplified by a gain factor in certain embodiments and the range of the amplified signal may be selectively limited, with the frequency modulation value being computed at least partially based on the range limited amplified signal. In certain embodiments, the output current feedback signals or values are converted to a synchronous reference frame and the frequency modulation value is computed based at least partially on the estimated output current signal or value in the synchronous reference frame.

Non-transitory computer readable mediums are provided in accordance with further aspects of the disclosure, having computer-executable instructions for sensorless motor speed control in a motor drive, including instructions for sampling at least one AC output current feedback signal or value, computing a frequency modulation value based on the output current feedback and/or based on at least one voltage command or feedback signal or value, as well as adjusting a frequency or speed setpoint value at least partially based on the frequency modulation value and controlling an inverter according to the adjusted frequency or speed setpoint value.

Motor drives are provided according to further aspects of the disclosure, including an inverter and a sensorless motor speed controller with a signal generator that computes a frequency modulation value based on at least one AC output current feedback signal or value, an adjustment component that adjusts the frequency or speed setpoint value based at least partially on the frequency modulation value, and a command generator component which provides switching control signals to the inverter at least partially according to the adjusted frequency or speed setpoint value.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1A:
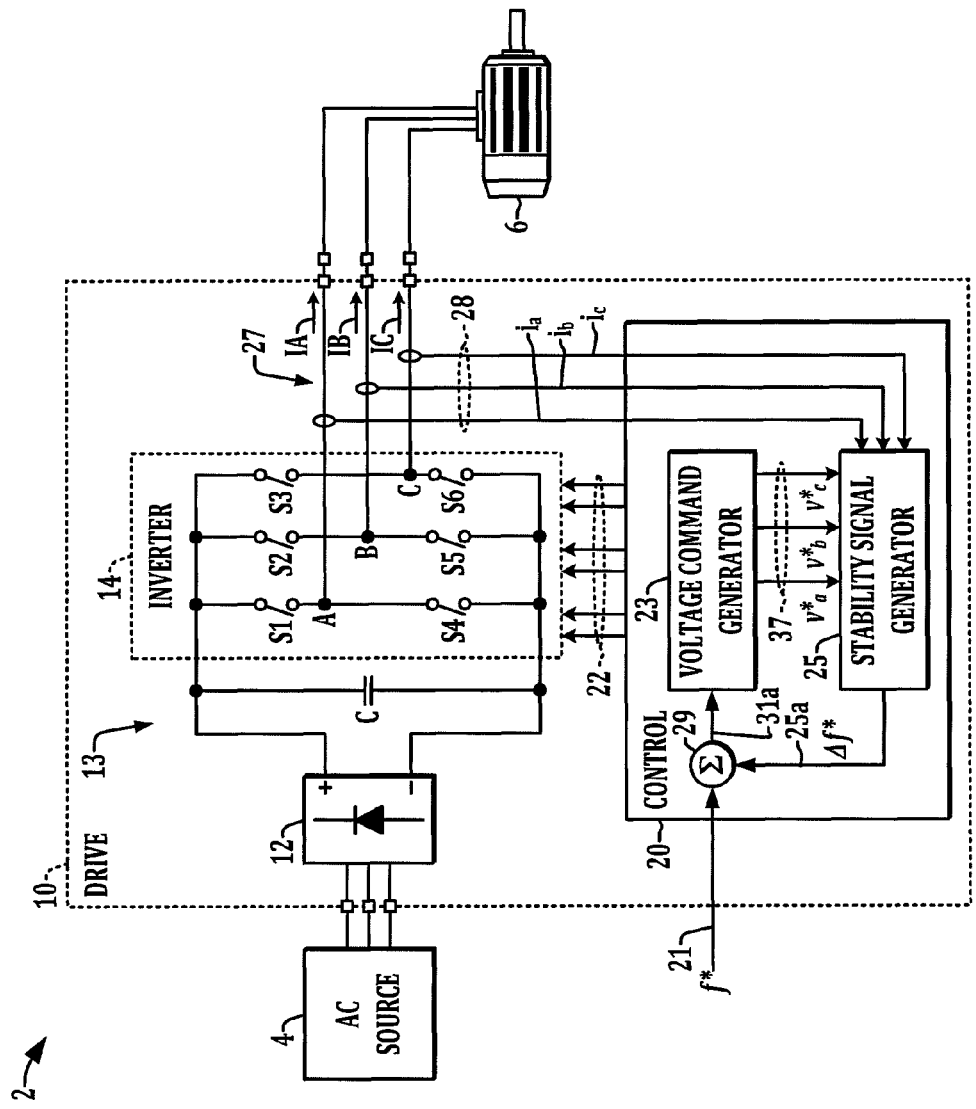
FIG. 1A is a schematic diagram illustrating an exemplary motor drive with a stability signal generator creating a frequency modulation value for adjusting a speed or frequency setpoint to create inverter switching control signals for enhanced stability in sensorless motor speed control according to one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

Reference is made to U.S. patent application Ser. No. 13/868,216, filed Apr. 23, 2013 and entitled "Position Sensorless Open Loop Control for Motor Drives with Output Filter and Transformer", the entirety of which is hereby Incorporated by reference.

Sensorless motor drives are used in a variety of applications, particularly where providing position and/or speed sensors directly at a motor load is difficult or impractical. A typical sensorless system employs a voltage-frequency (V/F, alternatively known as Volts per Hertz, V/Hz) controller providing a voltage setpoint according to a desired motor speed or frequency, and this form of sensorless control has been used primarily with induction motors. In certain applications, a step-up transformer may be used to boost the motor drive output voltage, allowing use of a low-voltage drive to power a medium voltage induction motor, and/or to reduce $I^2R$ losses and facilitate use of a smaller diameter cable wire for long cable runs between the motor drive and the driven motor. Certain applications also employ sine wave filters, such as LC filters to suppress reflected wave voltage spikes associated with pulse width modulated (PWM) variable frequency drives. Use of sensorless voltage-frequency control techniques, however, may lead to problems, particularly where a transformer and/or sine wave filter is connected between the motor drive and the motor load. Conventional sensorless field-oriented-control (FOC) or other open loop speed control techniques have thus been found generally unsuitable for low-speed motor drive operation where output filters and transformers are used, such as in electric submersible pumps (ESPs), and these difficulties are particularly problematic in driving permanent magnet synchronous motors (PMSMs). Moreover, voltage-frequency control in combination with a sine wave filter under starting conditions may result in the motor not being able to start, with large oscillations on the rotor shaft for low frequency commands. Motors in sensorless speed control applications also suffer from oscillation in rotor velocity about the setpoint speed following load transitions or speed setpoint adjustments, particularly at low speeds. In certain situations, moreover, the driven motor may be unable to successfully start from a stopped condition due to unstable motor speed oscillations. Thus, improved techniques and motor drives are needed for sensorless motor speed control, particularly for driving permanent magnet motors to provide improved stability control.

Methods 100 and motor drive apparatus 10 are presented below for sensorless or open loop motor speed control using a stability signal generator as part of the motor drive controller. The control techniques and motor drives may be used in a variety of applications, including without limitation driving electric submersible pumps, whether including an induction motor or a permanent magnet synchronous motor (PMSM), and may be employed in situations in which the motor drive is directly connected to the driven motor or where one or more intervening components (e.g., sine wave filters and/or transformers) are connected between the output inverter and the driven motor. In addition, the concepts of the present disclosure may be employed in conjunction with any suitable form of control command algorithm, including without limitation voltage-frequency and/or current-frequency control, using any suitable internal closed loop feedback regulation configuration (e.g., proportional-integral or PI control components). The presently disclosed techniques, moreover, may be successfully employed to improve stability in operating permanent magnet and/or induction motors to avoid or mitigate undesirable "hunting" (oscillation) and/or undesired motor stopping or inability to start, particularly for low speed operation and/or in the presence of changes or perturbations in the load and/or desired setpoint operating speed. In this regard, while illustrated and described in various exemplary embodiments below, the various aspects of the present disclosure, and in particular the stability control techniques may be used in a wide variety of motor drive applications, motor drive controller architectures, etc., and the various concepts are not limited by the illustrated embodiments.

Figure 1B:
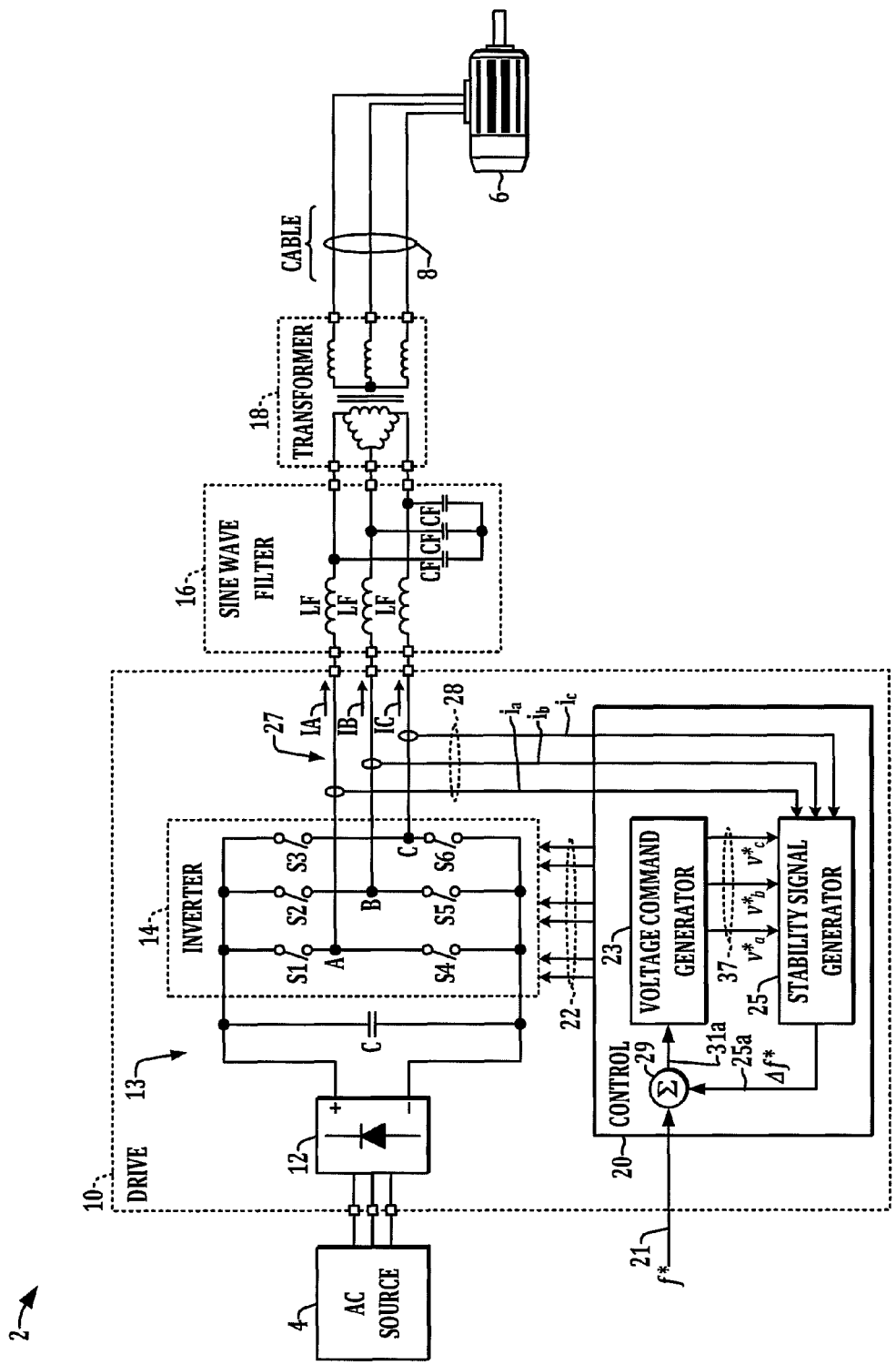
FIG. 1B is a schematic diagram illustrating a motor drive with a stability signal generator used in sensorless speed control of a motor connected to the inverter output through a sine wave filter and a transformer.

Referring initially to FIGS. 1A and 1B, various exemplary motor drives 10 are presented hereinafter, in sensorless or open loop speed control configurations wherein no direct measurement of the motor speed or position is provided. While these circumstances are common in remotely driven motor situations (e.g., submersible pump applications, etc.), the various stability control aspects of the present disclosure may also be employed in systems in which the actual motor speed is directly measured and feedback signals are provided to the motor drive controller. As shown in FIGS. 1A and 1B, a power conversion system 2 generally includes an AC power source 4 providing single or multiphase power (e.g., 480 V AC, 50 or 60 Hz) to a motor drive power converter 10. The motor drive 10, in turn, includes one or more power conversion stages with an inverter 14 providing single phase or multiphase AC output currents (e.g., three-phase output currents IA, IB and IC in the illustrated examples) to drive a motor load 6. As shown in FIG. 1A, the motor load 6 may be directly driven by the output of the motor drive inverter 14, or one or more intervening circuits may be connected between the inverter 14 and the motor load 6, such as one or both of a sine wave filter 16 and/or a transformer 18 and a potentially lengthy cable 8 as illustrated in FIG. 1B.

The drive 10 in these examples includes an active or passive rectifier 12 providing rectification of the received (e.g., three-phase) AC input power to create a DC bus voltage across a DC link circuit 13 including a capacitance C. Any suitable form of rectifier 12 can be used, including without limitation a passive rectifier (e.g., one or more rectifier diodes), or a switching rectifier operating at or near the fundamental frequency of the AC input source (fundamental front end or FFE) or at a higher and possibly variable switching, frequency, such as an active front end (AFE) rectifier that performs additional functions such as power factor correction, etc. The DC link circuit 13 provides a DC input voltage to a switching inverter 14. The inverter 14 in this example includes switching devices S1, S2, S3, S4, S5 and S6 operated according to inverter switching control signals 22 from a controller 20 to convert the DC power to AC output currents IA, IB and IC for driving the motor load 6. Although the illustrated inverter 14 provides a three-phase two-level output, other single or multiphase or multilevel output implementations are possible within the scope of the present disclosure. Any suitable inverter switching devices S1-S6 may be used, including without limitation insulated gate bipolar transistors (IGBTs), silicon controlled rectifiers (SCRs), gate turn-off thyristors (GTOs), integrated gate commutated thyristors (IGCTs), etc. The controller 20 and the elements and components thereof can include suitable logic or processor-based circuitry, and may also include signal level amplification and/or driver circuitry (not shown) to provide suitable drive voltage and/or current levels sufficient to selectively actuate the switching devices S1-S6, for instance, such as comparators, carrier wave generators or digital logic/processor elements and signal drivers, etc. Moreover, the controller 20 can provide the switching control signals 22 according to any suitable pulse width modulation technique, including without limitation space vector modulation (SVM), carrier-based pulse width modulation, selective harmonic elimination (SHE), etc. In addition, the controller 20 implements various computational functions as detailed hereinafter and may include suitable analog to digital and digital to analog conversion components and processor-based or otherwise programmable logic circuitry alone or in combination with analog circuitry to perform various operations on signals or values as described herein. Furthermore, certain embodiments of the controller 20 may include processing elements and electronic memory for storage of data and program instructions by which the controller 20 may implement the various methods (e.g., method 100 below) detailed herein.

The system 2 in FIG. 1B further includes a sine wave or output filter 16, in one example, a three-phase LC filter having a series filter inductor LF in each output line, as well as a corresponding filter capacitor CF coupled between the corresponding phase line and a common connection point. Other output filter topologies may be used, such as LCL filters, CLC filters, etc. with one or more series elements and further filter elements (e.g., filter capacitors CF) connected in any suitable delta or Y configuration. The example of FIG. 1B also includes a transformer 18 between the filter 16 and the motor cable 8. The illustrated transformer 18 has a three phase delta-connected primary as well as a Y-connected secondary, although any suitable transformer primary and/or secondary winding configuration or topology may be used. Moreover, the transformer 18 may in certain embodiments be a step-up transformer. For example, a step-up transformer 18 may facilitate use of a low-voltage drive 10 to power a medium or high voltage motor 6, or allow use of a medium-voltage drive 10 to power a high-voltage motor 6. Also or in combination, a step-up transformer 18 may be useful to allow a reduction in the current levels carried by the cable 8, thereby facilitating use of smaller diameter cable wires in the cable 8. The cable 8, moreover, can be of any suitable construction for interfacing the motor drive output, the sine wave filter 16, and/or the transformer 18 with the leads of the motor 6.

The motor drive 10 and the controller 20 operate in sensorless fashion to control one or more operating parameters of the driven motor load 6. For example, the controller 20 provides the inverter switching control signals 22 in order to control position and/or speed and/or torque of the motor 6 without directly sensing any of these controlled parameters. In the illustrated implementation, for instance, current sensors 27 are disposed at the output of the inverter 14 to provide feedback signals or values 28 (e.g., $i_a$, $i_b$ and $i_c$) to the controller 20 which represent the inverter output currents IA, IB and IC, and/or from which the values of these output currents can be computed, derived or otherwise estimated. Any suitable current sensing devices 27 can be used to generate or provide the signals and/or values 28, and may provide analog signals 28 and/or the sensors 27 may be smart sensors providing digital values 28 representing the output currents IA, IB and IC generated at the output of the inverter 14.

The controller 20 uses the feedback signals or values 28 as well as one or more desired operating parameters to regulate or adjust the output currents IA, IB and IC. Overall, however, the control technique implemented by the illustrated controller 20 is essentially sensorless or open-loop with respect to the actual operating condition of the driven motor load 6 (e.g., speed and/or position), as there are no direct feedback signals obtained from the motor 6 itself. In the examples of FIGS. 1A and 1B, for instance, the controller 20 receives the desired frequency or motor speed value f* 21 from a supervisory control system component (not shown), which may be a distributed control system (DCS) element, a user-adjustable knob, local user interface, etc. The controller 20, moreover, includes a voltage command generator component 23, which can be a voltage-frequency 24 or current-frequency control component 24a (e.g., FIGS. 2-4 below). There may also be a closed loop controller such as a proportional-integral (PI) controller 26 which may be a reduced bandwidth PI controller in certain embodiments (e.g., FIG. 4 below). In operation, the control components 24a and 26 in FIG. 3 are used to regulate the inverter output currents IA, IB and IC by providing the inverter switching control signals 22 according to the desired speed or frequency signal or value 21 and the feedback signals or values 28.

In addition, in accordance with one or more aspects of the present disclosure, the controller 20 implements a stability signal generator component 25 which computes a frequency modulation value 25a (e.g., $\Delta f^*$) based on the current feedback signal or value $i_a$, $i_b$ and $i_c$ as well as on one or more voltage command signals or values 37 $v_a^*$, $v_b^*$ and $v_c^*$ used in controlling the inverter 14. As seen in FIGS. 1A and 1B, for instance, the voltage command generator component 23 internally generates the voltage commands $v_a^*$, $v_b^*$ and $v_c^*$ and provides these to the stability signal generator component 25 for generating the frequency modulation value 25a. The sensorless motor speed controller 20 also includes an adjustment component 29 (e.g., a summer in one example) which adjusts the frequency or speed setpoint value 21 based at least partially on the frequency modulation value 25a to provide an adjusted frequency or speed setpoint value 31a (e.g., $f_{AD}$ in FIGS. 2-4 below), and the command generator 23 provides the switching control signals 22 to the inverter 14 at least partially according to the adjusted frequency or speed setpoint value 31a. In the illustrated example, the adjustment component 29 subtracts the frequency modulation value 25a from the frequency or speed setpoint value 21 to provide the adjusted frequency or speed setpoint value 31a. Other implementations are possible, in which an adjustment component 29 performs a different type of adjustment, such as offsetting, multiplication, division, addition, or combinations thereof, etc., wherein the concepts of the present disclosure are not limited to the illustrated subtraction example.

Figure 2:
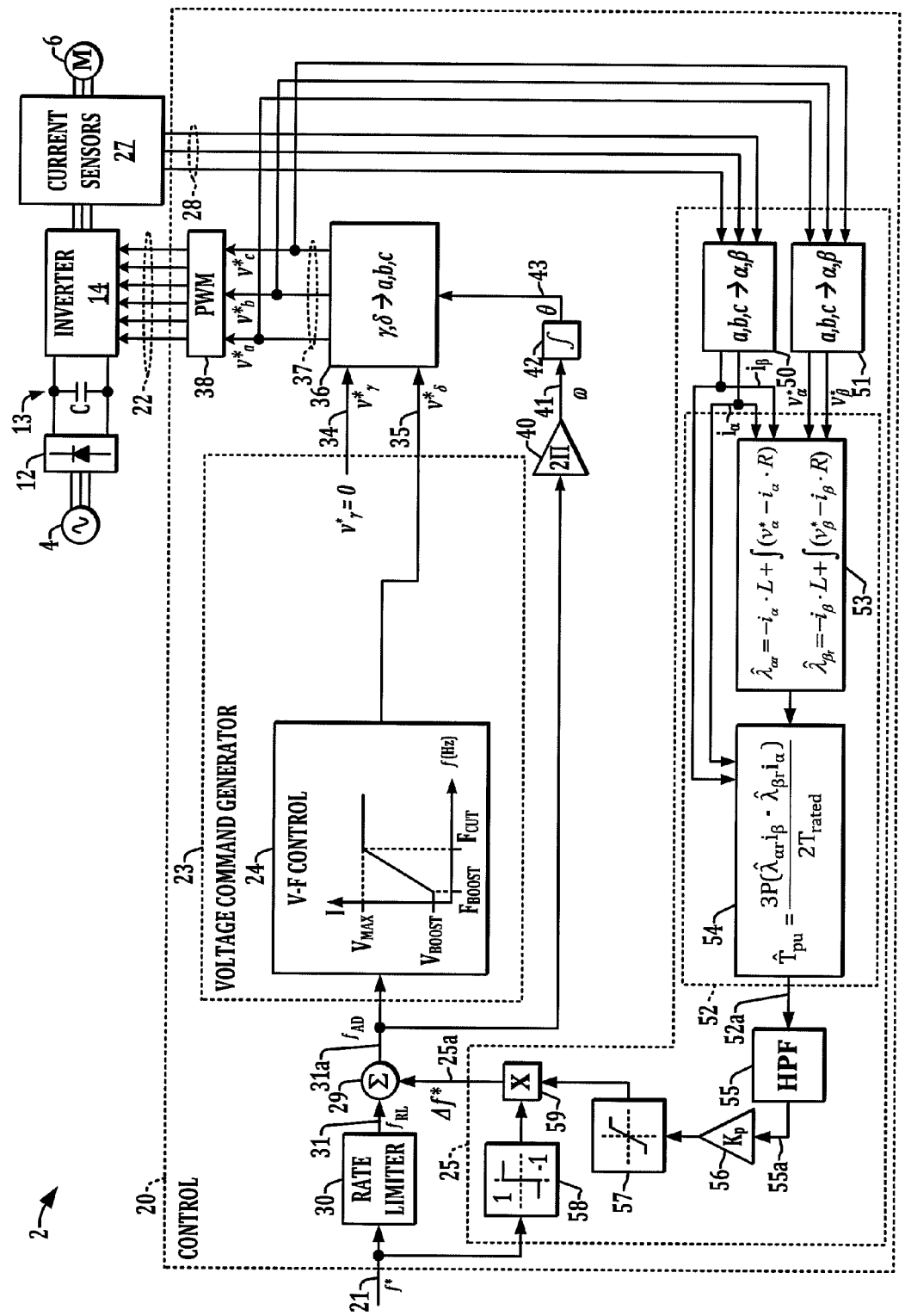
FIG. 2 is a schematic diagram illustrating an exemplary motor drive controller with a stability signal generator and a voltage-frequency control configuration.
Figure 3:
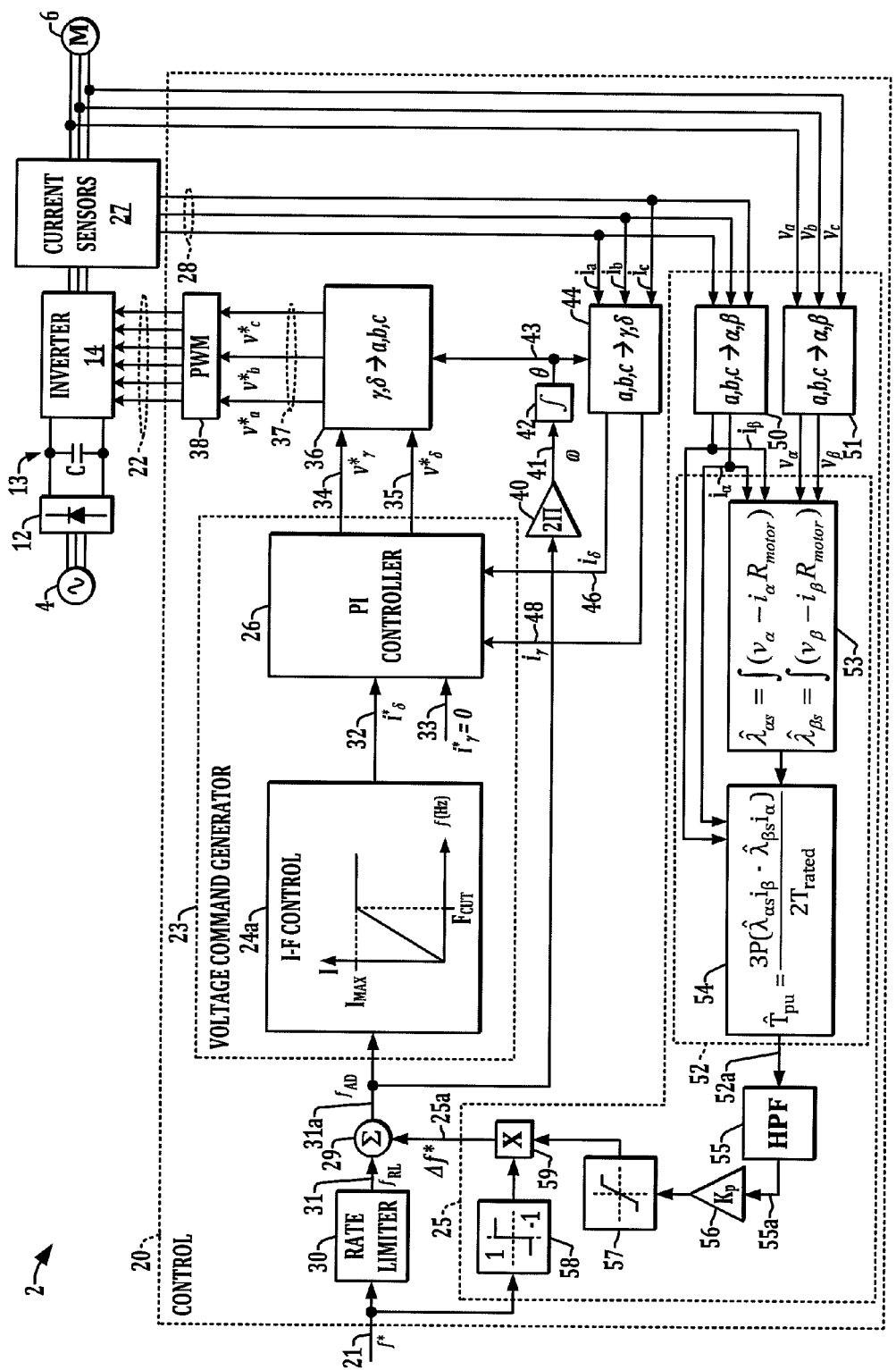
FIG. 3 is a schematic diagram illustrating another exemplary motor drive controller with the stability signal generator and a current-frequency controller.
Figure 4:
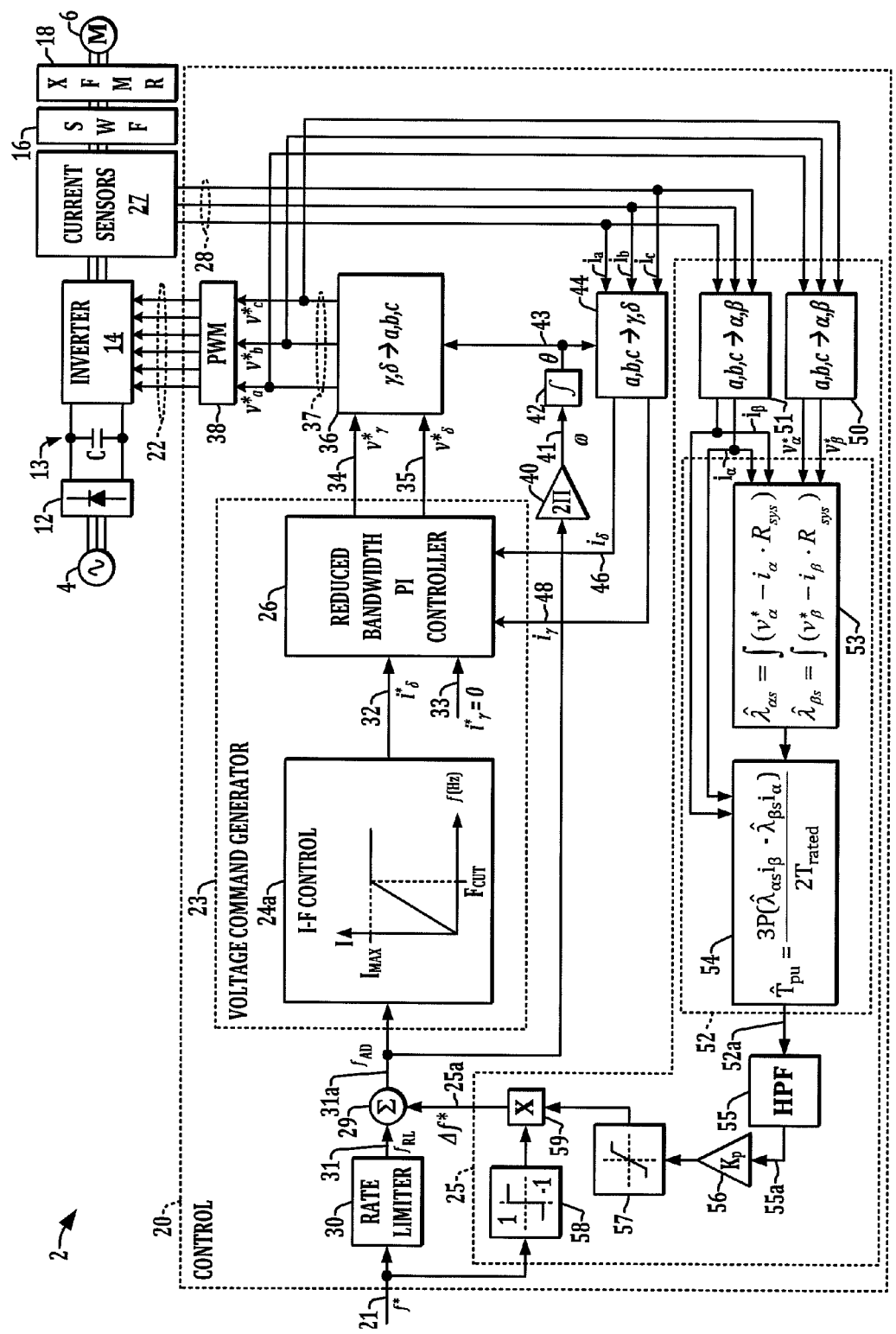
FIG. 4 is a schematic diagram illustrating yet another motor drive controller with a stability signal generator and a current-frequency controller with a reduced bandwidth proportional-integral (PI) controller for driving a motor through a sine wave filter and transformer.

Referring also to FIGS. 2-4, FIG. 2 shows further details of an exemplary motor drive controller 20 with a stability signal generator 25 and a voltage-frequency control configuration implemented in the voltage command generator 23. The voltage command generator 23 includes a voltage-frequency (V-F) control component 24 which receives the adjusted frequency setpoint 31a from the adjustment component 29 and generates a δ-axis voltage setpoint ($v^*_\delta$) 35 accordingly. The controller 20 implements various components, for example, in processor-executed software or firmware, and operates on certain variables in a synchronous δ, γ reference frame, with received feedback signals or values 28 and generated switching control signals 22 being reference to a stationary (e.g., a, b, c) reference frame. In this regard, the illustrated δ, γ reference frame rotates at the same frequency as the conventional field commutation control (D, Q) reference frame, but the position need not be the same, with γ and δ somewhat analogous to "d" and "q", but they are not necessarily aligned (e.g., γ will likely be somewhere between the D axis and the Q axis, and γ and δ are orthogonal to one another). It is also understood that the described voltage and/or current regulation can be performed in other reference frames. The voltage-frequency control component 24 in the example of FIG. 2 provides a voltage setpoint output 35 based on the adjusted frequency or speed setpoint signal or value 31a. As seen in FIG. 2, moreover, a rate limiter 30 may optionally be included to rate limit the frequency or speed setpoint value 21 to provide a rate limited frequency or speed setpoint value 31 ($f_{RL}$), and the adjustment component 29 in this example subtracts the frequency modulation value 25a from the rate limited frequency or speed setpoint value 31 to provide the adjusted frequency or speed setpoint value 31a as an input to the control component 24.

The illustrated voltage-frequency control component 24 implements a multiple-range curve or function as illustrated, with the voltage-frequency relationship having a zero voltage value $V_{BOOST}$ corresponding to a zero frequency value (e.g., 0 Hz), and remains constant at $V_{BOOST}$ until a predetermined boost frequency $F_{BOOST}$. The voltage-frequency relationship implemented by the control component 24 also includes a second portion with increasing voltage values corresponding to a frequency range from the boost frequency $F_{BOOST}$ to a cutoff frequency value $F_{CUT}$, as well as a higher portion with a constant voltage value (e.g., $V_{MAX}$) corresponding to frequencies above the cutoff frequency $F_{CUT}$, where $V_{MAX}$ can be the maximum rated output voltage of the inverter 14 in certain implementations, and the cutoff frequency $F_{CUT}$ is preferably set to correspond to the rated operating frequency of the motor 6 (e.g., about 60 Hz in one implementation). The control component 24 in certain embodiments can be implemented using a lookup table or a parametric function. The voltage-frequency output $v^*_\delta$ is the δ axis voltage setpoint 35. In the illustrated embodiment, the controller 23 operates according to a zero γ axis value 34 ($v^*_\gamma=0$), although not a strict requirement of all implementations of the present disclosure.

Figure 10:
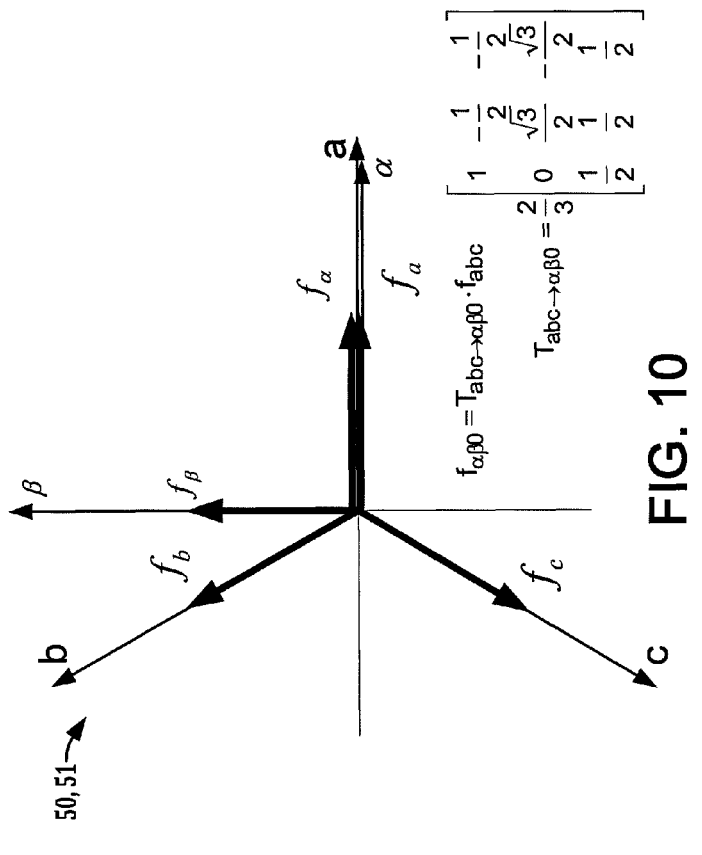
FIG. 10 is a graph illustrating a stationary reference frame transformation in the motor drive controller.

As seen in FIGS. 2 and 10, moreover, the illustrated stability signal generator 25 includes stationary reference frame converter components 50 and 51 for respective conversion of the current feedback signals 28 and the voltage command signals or values 37 from the a,b,c reference frame to a stationary "α,β" reference frame by the illustrative transformation shown in FIG. 10. In this manner, the converter 50 provides α,β reference frame current feedback signals $i_\alpha$ and $i_\beta$, and the converter 51 provides voltage command signals $v_\alpha^*$ and $v_\beta^*$, to a frequency modulation (FM) signal generator component 52. In the embodiment of FIG. 2, moreover, the signal generator component 25 employs the FM signal generator component 52 to compute an estimated motor performance value 52a, in this case an estimated (per unit) torque value $\hat{T}_{pu}$, based on the AC output current feedback $i_a$, $i_b$, $i_c$ (converted to signals or values $i_\alpha$ and $i_\beta$) and also based on the voltage command signals or values $v_a^*$, $v_b^*$, $v_c^*$ (e.g., converted signals or values $v_\alpha^*$ and $v_\beta^*$). In particular, the signal generator 52 includes a first component 53 which calculates estimated rotor flux linkage values $\hat{\lambda}_{\alpha r}$, $\hat{\lambda}_{\beta r}$ based on the output current feedback $i_\alpha$ and $i_\beta$, the voltage commands $v_\alpha^*$ and $v_\beta^*$, and on an output load resistance value R corresponding to the resistance of the motor 6 and any intervening cable 8 according to the following formulas (1) and (2):

$$\hat{\lambda}_{\alpha r} = -i_\alpha L + f(v_\alpha^* - i_\alpha R), \text{and} \quad (1)$$

$$\hat{\lambda}_{\beta r} = -i_\beta L + f(v_\beta^* - i_\beta R), \quad (2)$$

where L is the inductance of the motor and any intervening cable.

In addition, the signal generator 52 includes a second component 54 which is operative to compute the estimated torque value $\hat{T}_{pu}$ based on the estimated rotor flux values $\hat{\lambda}_{\alpha r}$ and $\hat{\lambda}_{\beta r}$, as well as on the current feedback $i_\alpha$ and $i_\beta$ according to the following equation (3):

$$\hat{T}_{pu} = \frac{3P(\hat{\lambda}_{\alpha r} i_\beta - \hat{\lambda}_{\beta r} i_\alpha)}{2T_{rated}}, \quad (3)$$

where P is the number of pole pairs in the motor 6 and $T_{rated}$ is the rated torque for the motor 6. In certain embodiments, the estimated torque value $\hat{T}_{pu}$ can be computed using stator flux values, and may be computed according to rotor flux values in other embodiments.

The estimated torque or other estimated motor performance value 52a is then used by the signal generator component 25 to compute the frequency modulation value 25a. As seen in FIG. 2, moreover, the illustrated embodiment includes a high pass filter 55 to filter the estimated motor performance value 52a to provide a filtered estimated motor performance value 55a, thereby removing undesirable DC offsets from the estimated motor parameter 52a. The signal generator 25 then computes the FM value 25a based at least partially on the filtered estimated motor performance value 55a. In the illustrated example, a gain component 56 is provided to amplify the filtered signal 55a, and a limiter circuit 57 may be included to limit the range of the amplified signal. The illustrated embodiment also includes an optional multiplier 59 which, for some embodiments of estimated motor performance value 52a, multiplies the output of the limiter 57 by a sign signal from a sign function 58 based on the sign (positive or negative, i.e. forward or reverse) of the desired frequency or speed setpoint input signal or value 21. The output of the multiplier 59 provides the frequency modulation value 25a to the summing junction adjuster component 29 for adjustment of the received (and optionally rate limited) speed or frequency setpoint to create the adjusted setpoint 31a.

The adjusted setpoint 31a provides an input to the voltage command generator 23 and the control component 24 thereof. The V-F controller 24, moreover, provides γ and δ axis voltage setpoint signal or value outputs $v_\gamma^*$ 34 and $v_\delta^*$ 35, respectively, which are converted to the stationary reference frame by a converter 36 (δ,γ to a,b,c) using a phase angle signal or value θ 43 obtained from the adjusted frequency setpoint 31a via a multiplier 40 (2π) providing a frequency output 41 (ω) and an integrator 42 to create the angle output 43. The reference frame converter 36, in turn, provides the set of three stationary reference frame voltage setpoint signals or values 37 ($v_a^*$, $v_b^*$ and $v_c^*$) as inputs to a pulse width modulation (PWM) component 38 that includes any suitable form of modulation, isolation, amplifiers, gate driver circuitry, etc. to generate the inverter switching control signals 22 for controlling the inverter 14 using known techniques.

FIG. 3 illustrates another controller embodiment 20 in which the stability signal generator 25 again provides the frequency modulation signal 25a for stability control based on an estimated torque value 52a. In this case, however, the voltage command generator 23 includes a current-frequency controller 24a along with a PI controller 26. In this case, moreover, an a,b,c to δ,γ converter 44 provides δ,γ current feedback signals $i_\gamma$ 48 and $i_\delta$ 46 as inputs to the PI controller 26 for closed loop regulation with respect to its current setpoints $i_\delta^*$ 32 and $i_\gamma^*$ 33 (=0). The current-frequency (I-F) control component 24a in this example receives the adjusted frequency or speed setpoint 31a, and generates the δ-axis current setpoint ($i_\delta^*$) 32 accordingly. In one possible implementation, the current-frequency control component 24a implements a dual-range curve or function as illustrated, with the current-frequency relationship being a zero current value corresponding to a zero frequency value (e.g., 0 Hz). As shown in FIG. 3, the current-frequency relationship implemented by the control component 24a includes a first portion with increasing current values corresponding to a first frequency range from the zero frequency value to a cutoff frequency value $F_{CUT}$, as well as a second portion with a constant current value (e.g., $I_{MAX}$) corresponding to frequencies above the cutoff frequency $F_{CUT}$, where $I_{MAX}$ can be the maximum rated output current of the inverter 14 in certain implementations, and the cutoff frequency $F_{CUT}$ is preferably set to correspond to a very low operating frequency of the motor 6 (e.g., about 0.5-1.0 Hz). The current-frequency control component 24a in certain embodiments can be implemented using a lookup table or a parametric function. In this regard, the current-frequency relationship includes the first ramped portion until the cutoff frequency, after which the maximum current is demanded, whereby the control component 24a avoids sending DC current to any included output transformer 18 (e.g., FIG. 4 below) at zero frequency.

The output ($i_\delta^*$) of the current-frequency controller 24a is the δ axis current setpoint 32, which is provided to the PI control component 26. PI control is not a strict requirement of all embodiments of the present disclosure, wherein any suitable current regulating algorithm can be used to regulate the inverter output currents IA, IB and IC, and the PI algorithm in certain embodiments may have an algorithm bandwidth that is less than the resonant frequency of any included sine wave filter 16 (e.g., FIG. 4 below). In the illustrated embodiment, the PI controller 26 operates according to a zero γ axis value 33 ($i^*_\gamma = 0$), although not a strict requirement of all implementations of the present disclosure.

In the example of FIG. 3, moreover, the FM signal generator 52 includes components 53 and 54, in this case computing an estimated motor performance value 52a as an estimated torque based on estimated stator flux linkage values via the component 53 according to a motor resistance value $R_{motor}$ associated with the driven motor 6 according to the following equations (4) and (5):

$$\hat{\lambda}_{\alpha s} = f(v_\alpha - i_\alpha R_{motor}), \text{ and} \quad (4)$$

$$\hat{\lambda}_{\beta s} = f(v_\beta - i_\beta R_{motor}). \quad (5)$$

where $v_\alpha$ and $v_\beta$ are measured motor voltages after the a,b,c to α,β transformation 51. In addition, the component 54 computes the estimated torque value according to the following equation (6):

$$\hat{T}_{pu} = \frac{3P(\hat{\lambda}_{\alpha s} i_\beta - \hat{\lambda}_{\beta s} i_\alpha)}{2 T_{rated}}. \quad (6)$$

FIG. 4 shows another motor drive controller 20 with a stability signal generator 25 and a voltage command generator 23 generating voltage commands, where the included PI controller is a reduced bandwidth proportional-integral controller for driving a motor 6 through a sine wave filter 16 and transformer 18. As in the examples above, moreover, the signal generator 25 computes an estimated per unit torque value $\hat{T}_{pu}$ for deriving the frequency modulation value 25a. The inventors have appreciated that limiting the bandwidth of the PI controller 26 avoids or mitigates large inrush current during power up, particularly where the drive 10 is providing output currents through a sine wave filter 16 and/or transformer 18. In certain applications, for instance, the sine wave filter 16 makes the inverter output particularly susceptible to large inrush currents, and limiting the bandwidth of the PI controller 26 (or other current regulation control algorithm implemented by the controller 20) to be well below the sine wave filter resonant frequency helps to mitigate or avoid high inrush current levels, particularly at power up.

Figure 5:
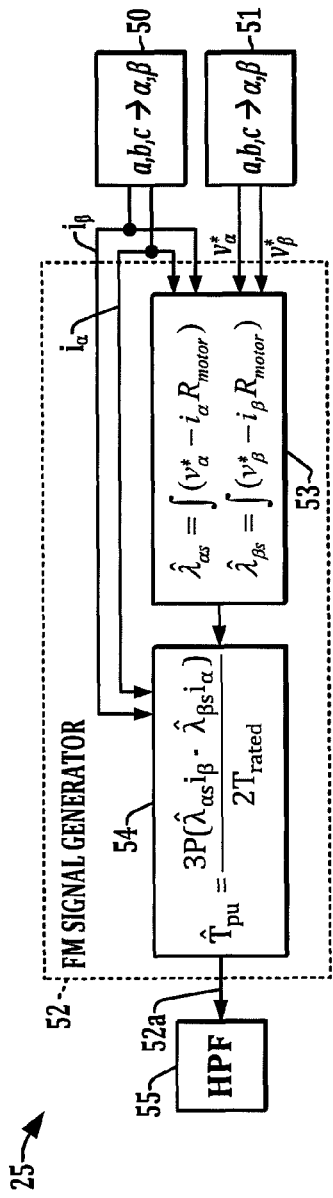
FIG. 5 is a schematic diagram illustrating an exemplary frequency modulation (FM) signal generator in the motor drive controller used for computing an estimated electromagnetic torque value based on estimated stator flux.
Figure 6:
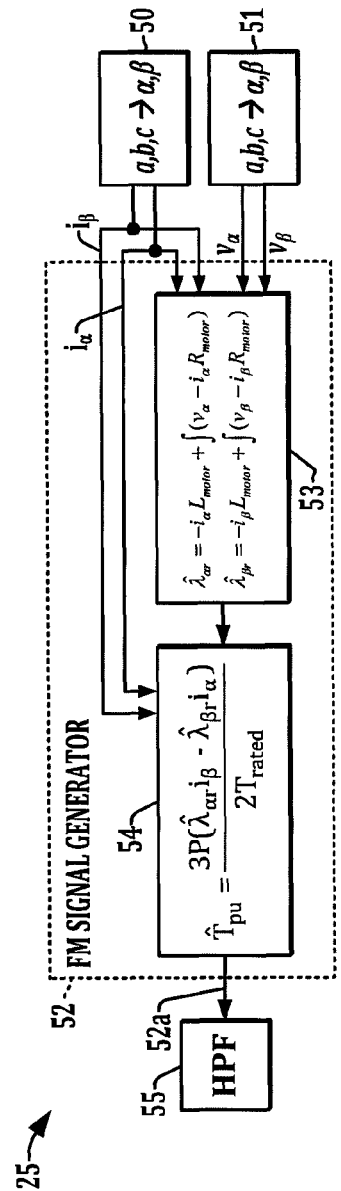
FIG. 6 is a schematic diagram illustrating another exemplary frequency modulation signal generator used to compute an estimated electromagnetic torque value based on estimated rotor flux.
Figure 7:
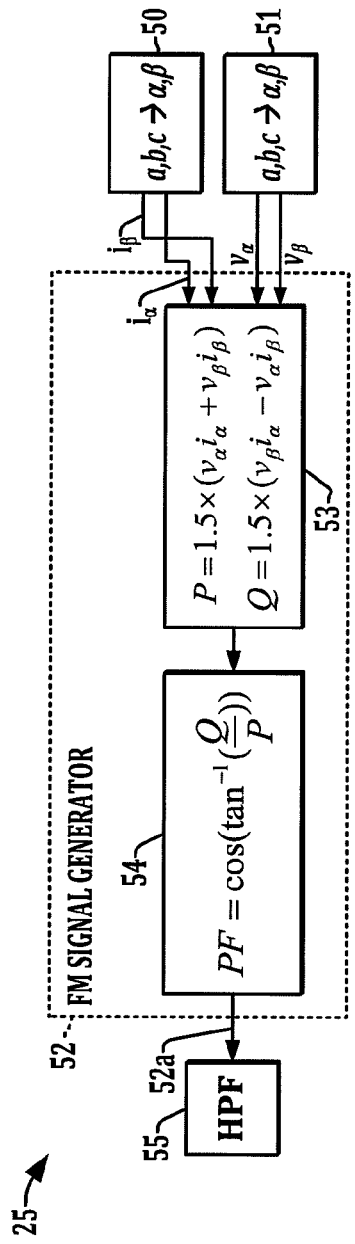
FIG. 7 is a schematic diagram illustrating yet another FM signal generator which computes an estimated power factor value for selective adjustment of the speed or frequency setpoint.
Figure 8:
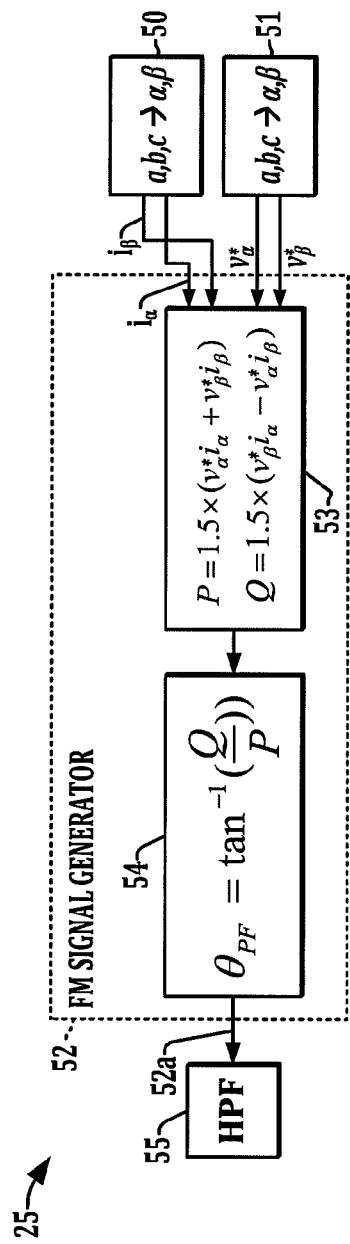
FIG. 8 is a schematic diagram illustrating another exemplary FM signal generator computing an estimated power factor angle for use in adjusting the speed or frequency setpoint.
Figure 9:
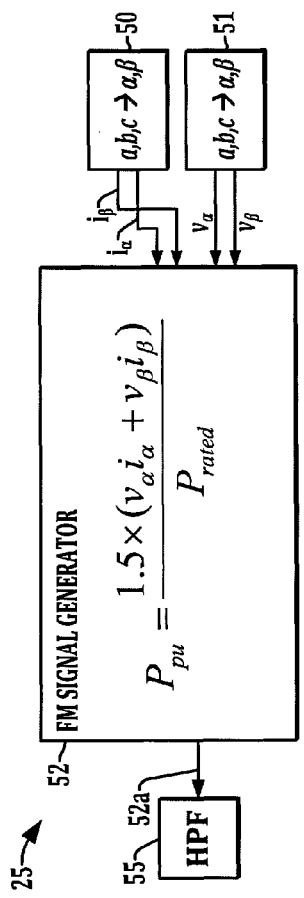
FIG. 9 is a schematic diagram illustrating still another FM signal generator computing an estimated power value for adjusting the speed or frequency setpoint.

Referring also to FIGS. 5-9, the above described examples use a frequency modulation signal generator 52 that computes estimated torque values 52a which are optionally high pass filtered using the filter 55 and scaled and limited appropriately via the components 56, 57, and optionally sign-adjusted via components 58 and 59 to provide the frequency modulation value 25a. Various other embodiments are possible, some of which are illustrated in FIGS. 5-9, in which the value 25a is derived based on a different estimated motor performance value 52a. For example, FIG. 5 illustrates an example based on per unit electromagnetic torque computed using stator flux values computed from measured currents and commanded voltages using the component 53, and FIG. 6 shows an example of a per unit estimated torque value computed from measured currents and measured voltages according to computed rotor flux estimate values. As seen in FIG. 7, another possible implementation provides an estimated power factor value 52a (PF) computed from measured currents and measured voltages according to real and imaginary power values P and Q from the component 53. FIG. 8 shows an implementation in which these real and imaginary power values are computed from measured currents and commanded voltages by the component 53, and the component 54 computes an estimated power factor angle value $\theta_{PF}$ 52a. Yet another example is shown in FIG. 9, in which the FM signal generator 52 provides a per-unit power estimate value 52a ($P_{pu}$) upon which the frequency modulation value 25a computation is performed. Other possible examples include computation of an estimated performance value 52a as an error between the open loop angle and an estimated rotor position.

Figure 11:
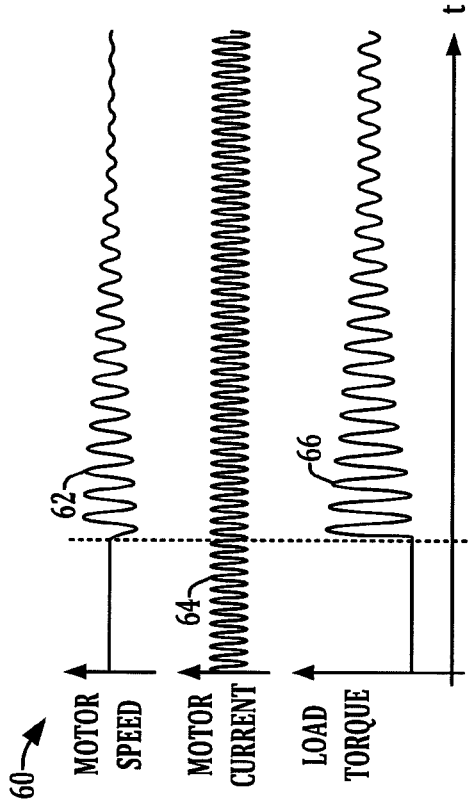
FIG. 11 is a graph showing motor speed, current and load torque curves for the motor drive without stability control for a step load change.
Figure 12:
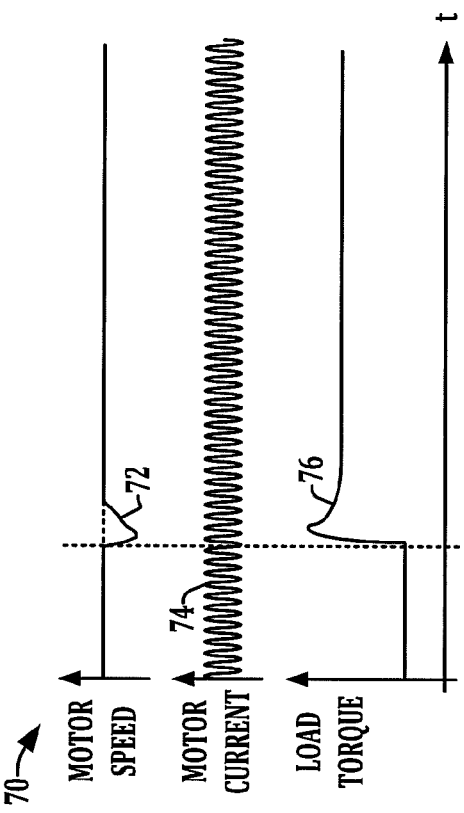
FIG. 12 is a graph showing motor speed, current and load torque curves for the motor drive using the stability control concepts of the present disclosure.

Referring now to FIGS. 11 and 12, graphs 60 and 70 respectively illustrate motor speed 62, 72, current 64, 74 and load torque 66 and 76 curves for the motor drive 10 without and with the stability control concepts of the present disclosure for a step load change. As seen in the graph 60 of FIG. 11, absent the stability control advantages achieved by the frequency modulation adjustment concepts discussed above, and particularly for low motor speeds, the onset of a step load increase in the load torque causes the open loop (sensorless) operation to suffer from potentially significant instability or "hunting" in the motor speed curve 62, resulting in oscillation in the load torque curve 66. In FIG. 12, however, the graph 70 shows that the load torque increase in curve 76 results in a temporary drop and subsequent controlled recovery in the motor speed curve 72 (assuming a constant desired motor speed setpoint value). In this regard, the controlled modulation of the frequency setpoint via the adjusted frequency setpoint value 31a effectively counteracts the effects of instability or hunting by compensation through the essentially out of phase frequency modulation signal 25a. In this manner, instability is mitigated, thereby preventing or reducing the likelihood of excessive motor speed or position hunting and reducing the potential for undesired motor stoppage.

Figure 13:
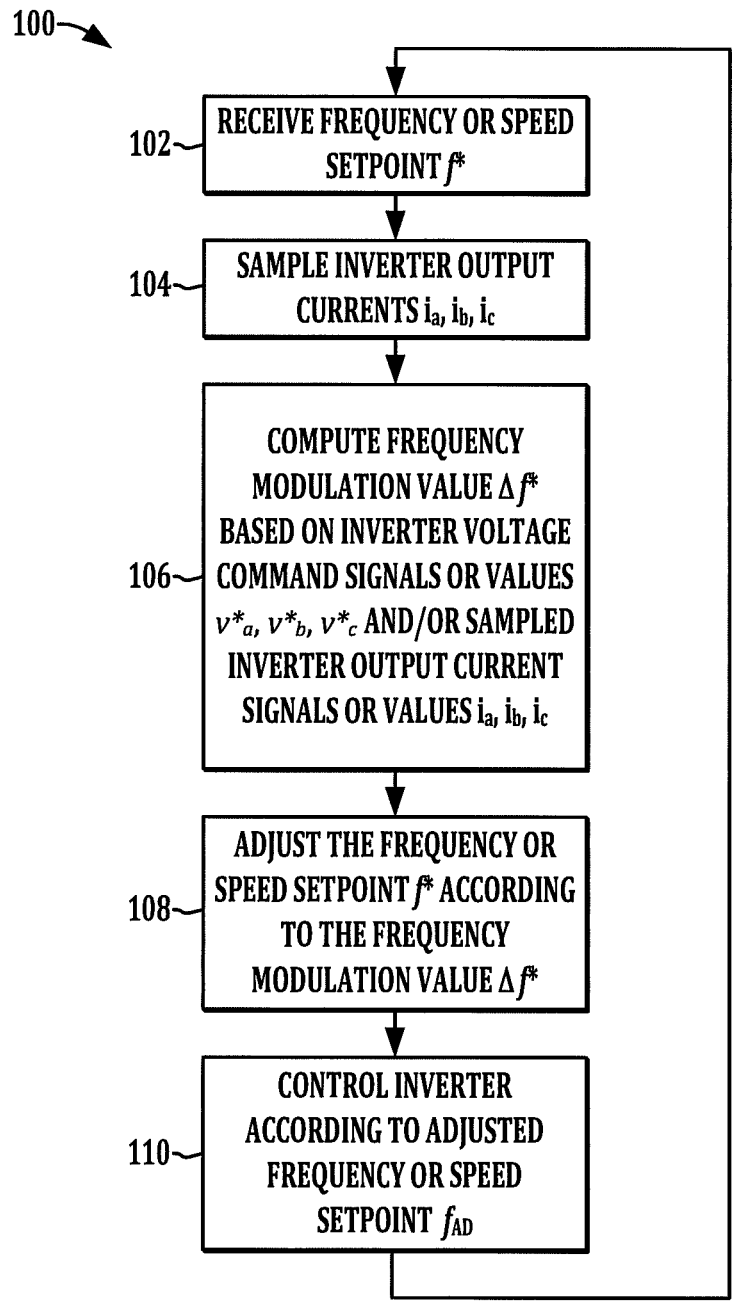
FIG. 13 is a flow diagram illustrating an exemplary method for sensorless motor speed control in the motor drive in accordance with further aspects of the present disclosure.

Referring also to FIG. 13, a method 100 is presented for sensorless motor speed control in a motor drive (e.g., motor drive 10 above). Although the exemplary method 100 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide sensorless motor control as described herein, and various embodiments or implementations include non-transitory computer readable mediums having computer-executable instructions performing the illustrated and described methods. For instance, the method 100 may be implemented using one or more processors associated with the controller 20, by executing instructions stored in an electronic memory operatively associated with the controller 20.

The method 100 begins at 102 in FIG. 13, with receipt of the frequency or speed setpoint f* (e.g., 21 above) representing the desired operating speed of the motor load 6. The setpoint 21 can be received at 102 from any suitable source, such as an input from another element in a distributed control system, user interface, etc. At 104, one or more inverter output currents are measured or sampled (e.g., feedback signals 28 representing the three-phase output currents $i_a$, $i_b$, $i_c$ provided by the inverter 14 and sensed using the current sensors 27 above). The sampled output currents, moreover, can be directly proportional to the actual measured inverter output currents, or the signals 28 can be filtered, shifted, or otherwise undergo any suitable signal processing such that the values 28 represent the current output provided by the inverter 14 to facilitate computation of one or more estimated motor operating parameters as discussed above. At 106 in FIG. 13, a frequency modulation value is computed (e.g., Δf* signal or value 25a above) at least partially according to the AC output current feedback and also according to one or more voltage command signals or values (e.g., $v_a^*$, $v_b^*$, $v_c^*$ above). In this regard, the voltage command signals or values can be any voltage command setpoints in any suitable reference frame (e.g., stationary reference frame, synchronous reference frame, etc.) which are used or usable for controlling operation of the inverter. In one example, for instance, the previously computed voltage command signals or values $v_a^*$, $v_b^*$, $v_c^*$ used in a previous control cycle can be used in computing the estimated motor operating parameter for use in offsetting the frequency or speed setpoint for the next or subsequent control cycle. At 108, the frequency or speed setpoint 21 (f*), whether previously rate limited or not (e.g., rate limited frequency setpoint $f_{RL}$ 31 above), is adjusted at least partially according to the frequency modulation value Δf*, for example, by subtracting the frequency modulation value Δf* from the original or rate limited frequency or speed setpoint 21, 31, in order to provide an adjusted setpoint $f_{AD}$. Using the adjusted frequency or speed setpoint $f_{AD}$, the inverter 14 is controlled at 110, after which the process 100 repeats as shown.

Figure 14:
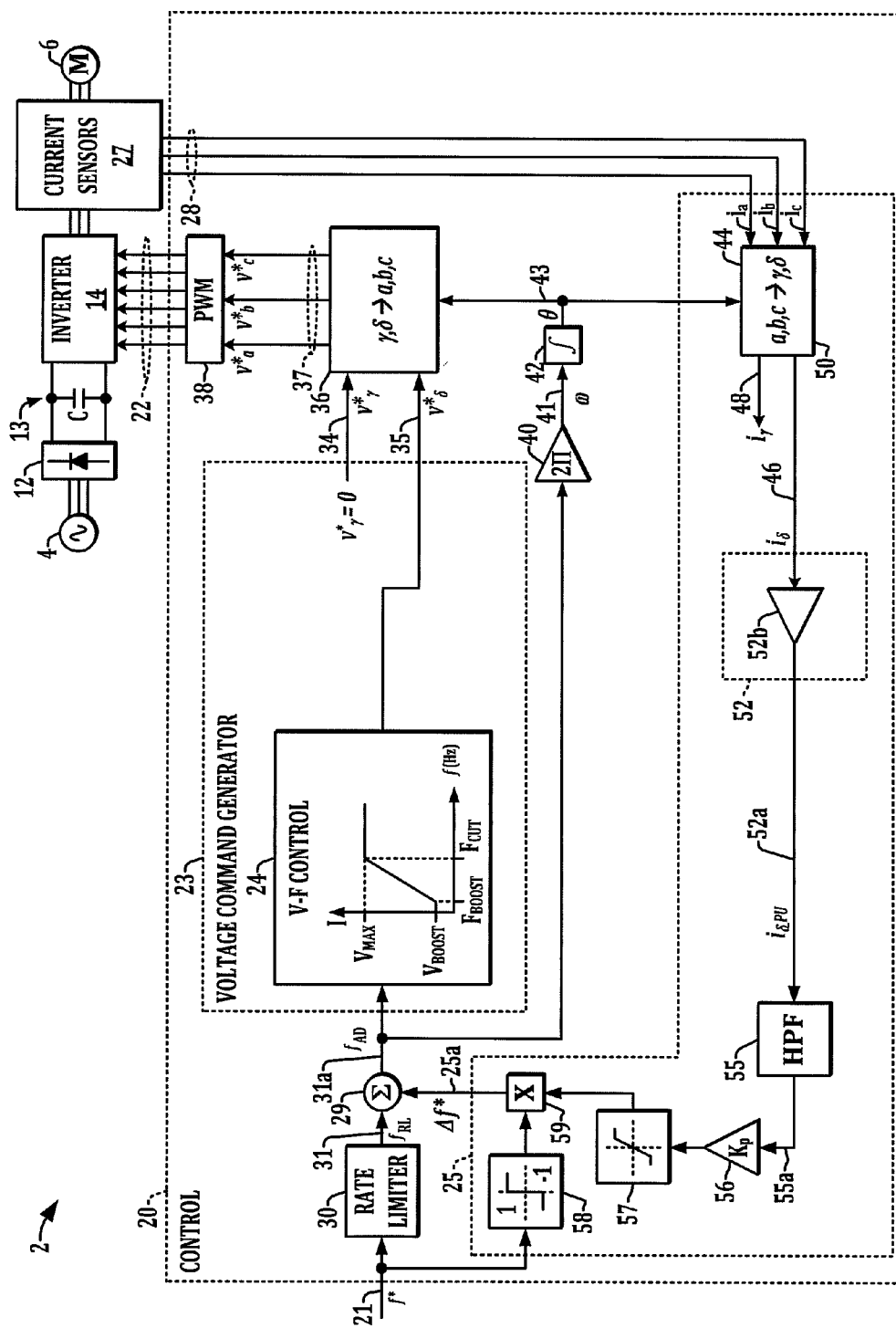
FIG. 14 is a schematic diagram illustrating another exemplary motor drive controller with a stability signal generator and a voltage-frequency control configuration.
Figure 15:
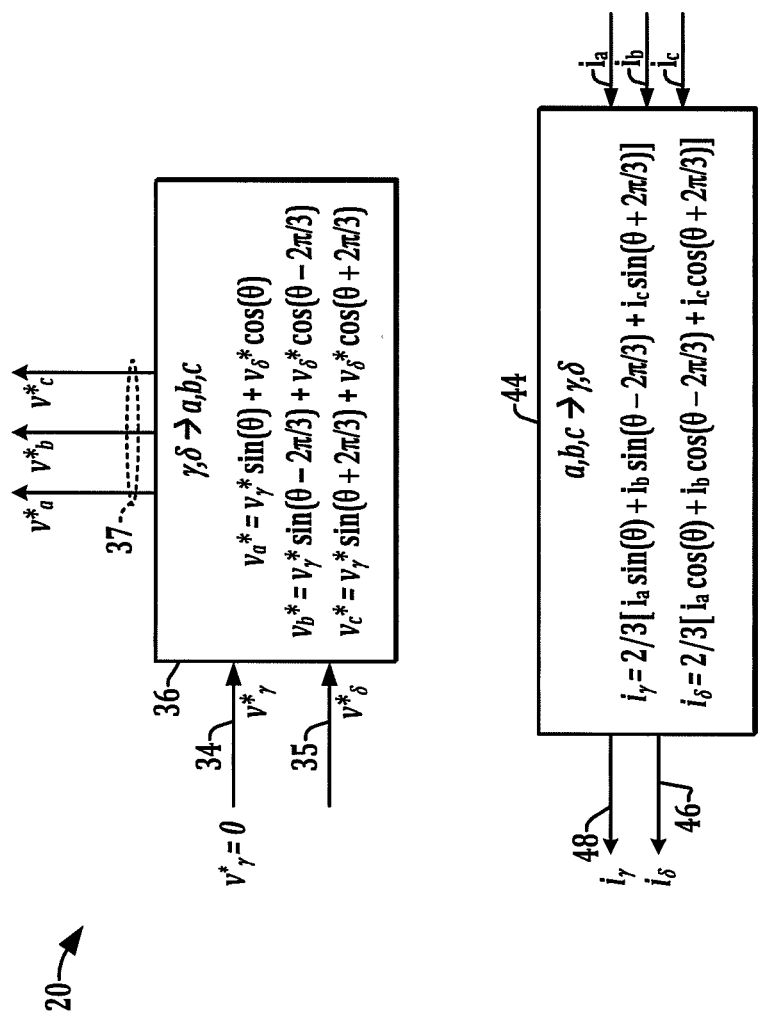
FIG. 15 is a schematic diagram illustrating exemplary transformations in the controller of FIG. 14.

Referring now to FIGS. 14 and 15, another exemplary motor drive controller embodiment 20 is shown in FIG. 14, where a voltage-frequency control component 24 is used to generate a δ-axis voltage command signal or value 35 ($v^*_\delta$). The signal or value 35 is converted by a γ,δ to a,b,c synchronous-to-stationary reference frame converter component 36 to provide stationary reference frame voltage command signals or values $v_a^*$, $v_b^*$, $v_c^*$ to the pulse width modulation component 38 for generating switching control signals to operate the inverter 14. Other implementations are possible, instead using a current-frequency control component to generate current control command signals or values for use in pulse width modulation operation of the inverter 14. FIG. 15 illustrates one non-limiting example of transformation equations in the converter component 36 to provide the δ-axis voltage command signal or value 35 (using $v^*_\gamma=0$), using a phase angle θ obtained from an adjusted frequency setpoint signal or value 31a via a gain stage 40 multiplying the adjusted frequency signal or value 31a by 2π to obtain a frequency signal or value 41 (ω in radians) and an integrator component 42 provides the angle θ according to the following equations (7)-(9):

$$v_a^* = v_\gamma^* \sin(\theta) + v_\delta^* \cos(\theta), \quad (7)$$

$$v_b^* = v_\gamma^* \sin(\theta - 2\pi/3) + v_\delta^* \cos(\theta - 2\pi/3), \quad (8)$$

$$v_c^* = v_\gamma^* \sin(\theta + 2\pi/3) + v_\delta^* \cos(\theta + 2\pi/3). \quad (9)$$

In the example of FIG. 14, moreover, the angle θ 43 is also provided to an a,b,c to γ,δ stationary-to-synchronous reference frame converter component 44 that receives the AC output current feedback signals or values 28 $i_a$, $i_b$ and $i_c$ from the output of the inverter 14 via the current sensors 27, and converts these to the synchronous γ,δ reference frame by computing a δ-axis estimated output current signal or value 46 ($i_\delta$). FIG. 15 illustrates an exemplary implementation of the stationary-two-synchronous reference frame converter 44, with which the δ-axis estimated output current signal or value 46 (e.g., and also a γ-axis value $i_\gamma$ 48) can be computed in the controller 20, according to the following equations (10) and (11):

$$i_\gamma = 2/3[i_a \sin(\theta) + i_b \sin(\theta - 2\pi/3) + i_c \sin(\theta + 2\pi/3)], \quad (10)$$

$$i_\delta = 2/3[i_a \cos(\theta) + i_b \cos(\theta - 2\pi/3) + i_c \cos(\theta + 2\pi/3)]. \quad (11)$$

The controller 20 in this embodiment uses the transformed output current signal or value 46 to compute a frequency modulation value 25a (Δf*), and employs a summation component 29 to selectively adjust the frequency or speed setpoint value f* 21 (or a rate limited value $f_{RL}$ 31) to provide an adjusted frequency or speed setpoint value 31a ($f_{AD}$) from which the voltage-frequency control component 24 computes the δ-axis voltage command signal or value 35. In this embodiment, the frequency modulation value 25a (Δf*) can be computed in any suitable fashion in whole or in part based on the AC output current feedback signal(s) or value(s) 28, 46 and the frequency modulation value 25a can be used to modify the original frequency or speed setpoint signal or value 21 and/or a rate limited signal or value 31 in any suitable fashion. In one possible embodiment, the adjustment is performed by subtracting the frequency modulation value 25a from the frequency or speed setpoint signal or value 21 or 31 to provide the adjusted frequency or speed setpoint value 31a.

In various embodiments, moreover, a gain stage 52b can be provided, as shown in FIG. 14, which is used to compute an estimated per unit output current signal or value 52a ($i_{\delta\_PU}$) based on the estimated δ-axis output current signal or value (46) in the synchronous (δ, γ) reference frame, and the frequency modulation signal or value 25a is computed at least partially based on the estimated per unit output current signal or value 52a. In the illustrated embodiment, moreover, the estimated per unit output current signal or value $i_{\delta\_PU}$ is high pass filtered via a filter component 55, thereby advantageously providing a filtered estimated per unit output current signal or value 55a with any DC components at least partially removed, thereby providing a signal 55a having AC components indicative of output current hunting or searching associated with large isolations in the rotor shaft of the motor 6 during starting for low frequency command input setpoints 21 and/or during rotor velocity isolation about the setpoint speed following load transitions or speed setpoint adjustments, particularly at low speeds.

In certain implementations, the filtered estimated signal or value 55a is provided as the frequency modulation signal or value 25a for adjusting the input setpoint signal or value 21, 31. In the illustrated embodiment, moreover, the signal or value 55a can be amplified by a gain factor ($K_p$), and a limiter circuit 57 may be included to limit the range of the amplified signal in certain non-limiting embodiments. In certain embodiments, a multiplier 59 may be implemented to multiply the output of the limiter 57 by a sign signal from a sign function 58 based on the sign (positive or negative, i.e. forward or reverse) of the desired frequency or speed setpoint input signal or value 21. The output of the multiplier 59 in the illustrated embodiment provides the frequency modulation value 25a to the summing junction adjuster component 29 for adjustment of the received (and optionally rate limited) speed or frequency setpoint to provide the adjusted setpoint 31a.

As illustrated and described above, power conversion systems, control apparatus, methods and non-transitory computer readable mediums having computer-executable instructions are provided for sensorless motor speed control via sampling at least one AC output current feedback signal or value, computing a frequency modulation value based at least partially on the output current feedback and/or based on at least one voltage command or feedback signal or value, as well as adjusting a frequency or speed setpoint value at least partially based on the frequency modulation value and controlling an inverter according to the adjusted frequency or speed setpoint value.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for sensorless motor speed control in a motor drive, the method comprising:
    sampling at least one multiphase AC output current feedback signal or value from an output of an inverter of the motor drive;
    computing a frequency modulation value in a stationary reference frame based on the at least one multiphase AC output current feedback signal or value;
    adjusting a frequency or speed setpoint value based at least partially on the frequency modulation value to provide an adjusted frequency or speed setpoint value; and
    controlling the inverter according to the adjusted frequency or speed setpoint value.

2. A method for sensorless motor speed control in a motor drive, the method comprising:
    sampling at least one AC output current feedback signal or value from an output of an inverter of the motor drive;
    computing a frequency modulation value based on the at least one AC output current feedback signal or value;
    adjusting a frequency or speed setpoint value based at least partially on the frequency modulation value to provide an adjusted frequency or speed setpoint value; and
    controlling the inverter according to the adjusted frequency or speed setpoint value:
    wherein adjusting the frequency or speed setpoint value comprises:
        rate limiting the frequency or speed setpoint value to provide a rate limited frequency or speed setpoint value; and
        subtracting the frequency modulation value from the rate limited frequency or speed setpoint value to provide the adjusted frequency or speed setpoint value.

3. The method of claim 2, wherein adjusting the frequency or speed setpoint value comprises subtracting the frequency modulation value from the frequency or speed setpoint value to provide the adjusted frequency or speed setpoint value.

4. The method of claim 3, wherein computing the frequency modulation value comprises:
    computing an estimated per unit output current signal or value based on the at least one AC output current feedback signal or value; and
    computing the frequency modulation value based at least partially on the estimated per unit output current signal or value.

5. The method of claim 4, wherein computing the frequency modulation value comprises:
    high pass filtering the estimated per unit output current signal or value to provide a filtered estimated per unit output current signal or value; and
    computing the frequency modulation value based at least partially on the filtered estimated per unit output current signal or value.

6. The method of claim 5, wherein computing the frequency modulation value comprises:
    amplifying the filtered estimated per unit output current signal or value by a gain factor to provide an amplified signal;
    selectively limiting a range of the amplified signal to provide a range limited amplified signal; and
    computing the frequency modulation value based at least partially on the range limited amplified signal.

7. A method for sensorless motor speed control in a motor drive, the method comprising:
    sampling at least one AC output current feedback signal or value from an output of an inverter of the motor drive;
    computing a frequency modulation value based on the at least one AC output current feedback signal or value;
    adjusting a frequency or speed setpoint value based at least partially on the frequency modulation value to provide an adjusted frequency or speed setpoint value; and
    controlling the inverter according to the adjusted frequency or speed setpoint value:
    wherein adjusting the frequency or speed setpoint value comprises subtracting the frequency modulation value from the frequency or speed setpoint value to provide the adjusted frequency or speed setpoint value.

8. The method of claim 7, wherein computing the frequency modulation value comprises:
    computing an estimated per unit output current signal or value based on the at least one AC output current feedback signal or value; and
    computing the frequency modulation value based at least partially on the estimated per unit output current signal or value.

9. The method of claim 8, wherein computing the frequency modulation value comprises:
    high pass filtering the estimated per unit output current signal or value to provide a filtered estimated per unit output current signal or value; and
    computing the frequency modulation value based at least partially on the filtered estimated per unit output current signal or value.

10. The method of claim 9, wherein computing the frequency modulation value comprises:
    amplifying the filtered estimated per unit output current signal or value by a gain factor to provide an amplified signal;
    selectively limiting a range of the amplified signal to provide a range limited amplified signal; and
    computing the frequency modulation value based at least partially on the range limited amplified signal.

11. A method for sensorless motor speed control in a motor drive, the method comprising:
    sampling at least one AC output current feedback signal or value from an output of an inverter of the motor drive;
    computing a frequency modulation value based on the at least one AC output current feedback signal or value;

adjusting a frequency or speed setpoint value based at least partially on the frequency modulation value to provide an adjusted frequency or speed setpoint value; and controlling the inverter according to the adjusted frequency or speed setpoint value:

wherein computing the frequency modulation value comprises:

computing an estimated per unit output current signal or value based on the at least one AC output current feedback signal or value; and computing the frequency modulation value based at least partially on the estimated per unit output current signal or value.

12. The method of claim 11, wherein computing the frequency modulation value comprises:

high pass filtering the estimated per unit output current signal or value to provide a filtered estimated per unit output current signal or value; and computing the frequency modulation value based at least partially on the filtered estimated per unit output current signal or value.

13. The method of claim 12, wherein computing the frequency modulation value comprises:

amplifying the filtered estimated per unit output current signal or value by a gain factor to provide an amplified signal;

selectively limiting a range of the amplified signal to provide a range limited amplified signal; and computing the frequency modulation value based at least partially on the range limited amplified signal.

14. The method of claim 1, A method for sensorless motor speed control in a motor drive, the method comprising:

sampling at least one AC output current feedback signal or value from an output of an inverter of the motor drive;

computing a frequency modulation value based on the at least one AC output current feedback signal or value;

adjusting a frequency or speed setpoint value based at least partially on the frequency modulation value to provide an adjusted frequency or speed setpoint value; and controlling the inverter according to the adjusted frequency or speed setpoint value:

wherein computing the frequency modulation value comprises:

high pass filtering the at least one AC output current feedback signal or value to provide a filtered estimated output current signal or value and computing the frequency modulation value based at least partially on the filtered estimated output current signal or value.

15. The method of claim 14, wherein computing the frequency modulation value comprises:

amplifying the filtered estimated output current signal or value by a gain factor to provide an amplified signal;

selectively limiting a range of the amplified signal to provide a range limited amplified signal; and computing the frequency modulation value based at least partially on the range limited amplified signal.

16. A method for sensorless motor speed control in a motor drive, the method comprising:

sampling at least one AC output current feedback signal or value from an output of an inverter of the motor drive;

computing a frequency modulation value based on the at least one AC output current feedback signal or value;

adjusting a frequency or speed setpoint value based at least partially on the frequency modulation value to provide an adjusted frequency or speed setpoint value; and controlling the inverter according to the adjusted frequency or speed setpoint value:

wherein computing the frequency modulation value comprises:

converting a plurality of AC output current feedback signals or values to a synchronous reference frame to compute an estimated output current signal or value in the synchronous reference frame, and computing the frequency modulation value based at least partially on the estimated output current signal or value in the synchronous reference frame.

17. The method of claim 16, wherein computing the frequency modulation value comprises:

computing an estimated per unit output current signal or value based on the estimated output current signal or value in the synchronous reference frame; and computing the frequency modulation value based at least partially on the estimated per unit output current signal or value.

18. The method of claim 17, wherein computing the frequency modulation value comprises:

high pass filtering the estimated per unit output current signal or value to provide a filtered estimated per unit output current signal or value; and computing the frequency modulation value based at least partially on the filtered estimated per unit output current signal or value.

19. A non-transitory computer readable medium with computer executable instructions for sensorless motor speed control in a motor drive, the computer readable medium comprising computer executable instructions for:

sampling at least one multiphase AC output current feedback signal or value from an output of an inverter of the motor drive;

computing a frequency modulation value in a stationary reference frame based on at least one of the multiphase AC output current feedback signal or value and at least one voltage command or feedback signal or value;

adjusting a frequency or speed setpoint value based at least partially on the frequency modulation value to provide an adjusted frequency or speed setpoint value; and controlling the inverter according to the adjusted frequency or speed setpoint value.

20. A motor drive, comprising:

an inverter including a plurality of switching devices operable according to switching control signals to provide AC output power to drive a motor load; and a sensorless motor speed controller providing the switching control signals to the inverter to regulate the AC output power at least partially according to a frequency or speed setpoint value, the sensorless motor speed controller comprising:

a signal generator component operative to compute a frequency modulation value in a stationary reference frame based on at least one multiphase AC output current feedback signal or value representing at least one AC output current of the inverter, an adjustment component operative to adjust the frequency or speed setpoint value based at least partially on the frequency modulation value to provide an adjusted frequency or speed setpoint value, and a command generator component operative to provide the switching control signals to the inverter at least partially according to the adjusted frequency or speed setpoint value.

* * * * *